April 21, 1970 M. S. DAVIDOW 3,507,433

TAPE STORAGE DEVICE

Filed Feb. 20, 1968 3 Sheets-Sheet 1

INVENTOR.
MARTIN S. DAVIDOW

BY John Cyril Malloy

ATTORNEY.

April 21, 1970 M. S. DAVIDOW 3,507,433

TAPE STORAGE DEVICE

Filed Feb. 20, 1968 3 Sheets-Sheet 2

INVENTOR.
MARTIN S. DAVIDOW

BY John Cyril Malloy

ATTORNEY.

INVENTOR.
MARTIN S. DAVIDOW
BY
John Cyril Malloy
ATTORNEY.

United States Patent Office 3,507,433

Patented Apr. 21, 1970

3,507,433

TAPE STORAGE DEVICE

Martin S. Davidow, 10330 SW. 45th St., Miami, Fla. 33165

Filed Feb. 20, 1968, Ser. No. 706,972
Int. Cl. B65h 17/42
U.S. Cl. 226—113 10 Claims

ABSTRACT OF THE DISCLOSURE

A tape storage device for vedio tape which is adapted to be connected to a unit for reproducing images on video tape, the storage device including means to arrange video tape in interconnected close, adjacent, hairpin loop form as the tape at all times remains in a continuous length, the means to arrange including a finger to orient the tape into the hairpin loops and means to move the hairpin loops continually toward the rear of a support tray, with the tape at all times lying on its longitudinal edge.

As is perhaps well known, there are video tape units in widespread use which include a reproduction head so that a long length of video tape may be fed past the reproduction head to cause images to appear on a screen. It will be apparent that provision for storage of the tape before and after travel past the head is required; and in order to do this, it is common to employ an input reel and a take-up reel on opposite sides of the head. This structure, however, necessitates rewinding of the tape in order to replay it. Because there are numerous situations in which a continuous tape play is desirable, without any interruption or rewinding, various structures to achieve this have been considered. For instance, cartridges have been developed to accommodate a continuous length of tape in a band form. Such cartridges define a main chamber to hold all of the convolutions of a coil of tape, except the innermost convolution, and onto the periphery of which tape is fed, and a raised annular chamber having an exit port for the innermost convolusion of the coil, whereby a continuous movement of the tape through the cartridge may be achieved. However, such reels have not proven satisfactory in the case of video tape because it is extremely thin, in the order of about one millimeter, which causes binding and resistance to removal from the main coil package, especially at about the innermost convolusion. Therefore, for use with video tape various types of storage units have been employed, such as a basket-type storage device into which tape is flowed in a continuous stream into a loose randomized pattern without specific orientation, i.e., so that the first in at the top of the container is the first out from the lower portion of the container from whence it passes through a guide means to the reproduction head. There have been difficulties with such basket-type storage facilities because when the tape is of substantial length, albeit very thin, weigth accumulates in the lower portion of the container which creases, bends and deleteriously affects the tape. For the same reason, other types of storage units through which tape passes in a vertical direction have not proven satisfactory.

The present invention provides a generally horizontal, although slightly tilted, storage tray onto which the tape is flowed in a continuous stream by a suitable feed means, and an improved distribution means (a) for orienting the tape within the tray into side-by-side interconnected, hair pin loops and (b) for continually moving groups of the hairpin loops rearwardly in the tray away from the entrance port and toward the entrance of an exit guide to travel the tape to the reproduction head whereby continuous movement of the tape in band form may be achieved.

It is, accordingly, an object of this invention to provide for use with a video tape unit, a storage tray which includes a feed means to move that tape into and out of the tray and distribution means to orient the tape as it flows into the tray into interconnected hairpin loops and to continually move the hairpin loops from the input of the tray toward the rear of the tray to exit from the tray for feeding through a reproduction unit without the necessity of rewinding the tape in order to achieve a continuous reproduction of messages thereon.

It is another object of this invention to provide improved storage tray for video tape and feed means to move the tape and to orient the tape within the tray in close, adjacent interconnected hairpin loop form so that the tape is at all times in a continuous length and may be replayed without the necessity of rewinding the same, the feed means including finger means arranged to distribute the tape laterally across the tray in the said hairpin loops and to continue to move the adjacent hairpin loops rearwardly in the tray in a stacked position with the tape at all times on its longitudinal edge resting on the tray while it is in a generally horizontal attitude.

It is another object of this invention to provide a relatively inexpensive tape storage device for replaying lengths of video tape without the necessity of rewinding the same which is simple in construction and is well adapted for the purpose of replaying long lengths of video tape continuously storing the same in close, adjacent hairpin loops so that it is not necessary to rewind the tape for continuous playing thereof.

In accordance with these and other objects which will become apparent hereinafter, the instant invention will now be described with reference to the accompanying drawings in which.

Figure 1:
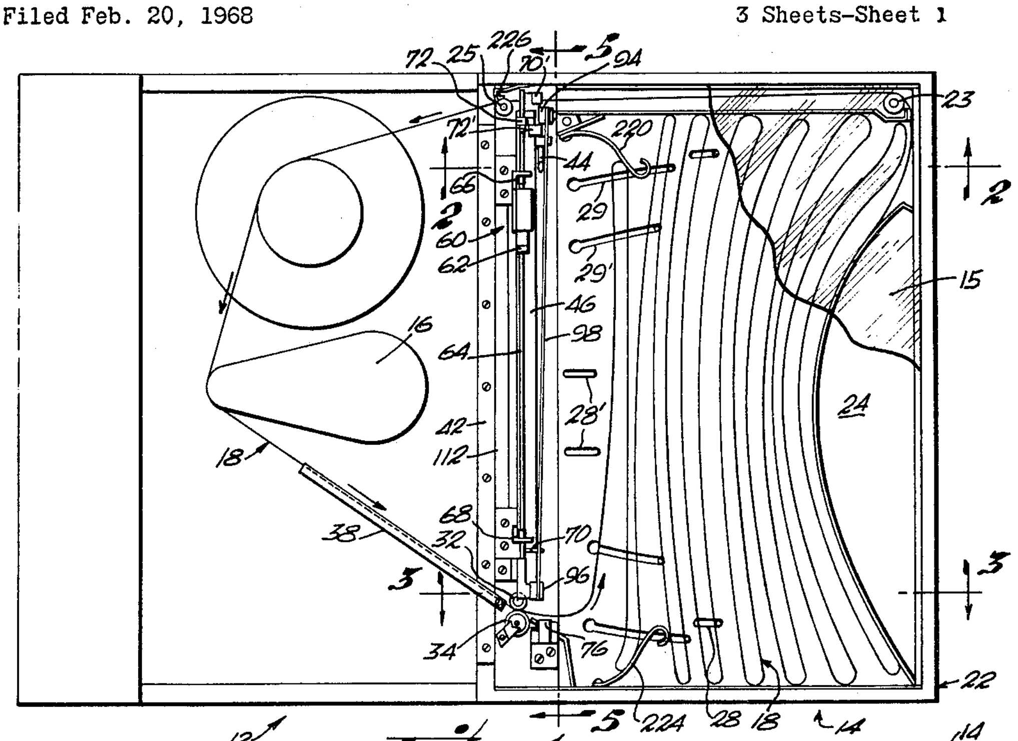
FIGURE 1 is a plan view of the combination of the improved device to store and feed tape and of the reproduction unit which includes the reproduction head for reproducing messages, such as on video tape.
Figure 2:
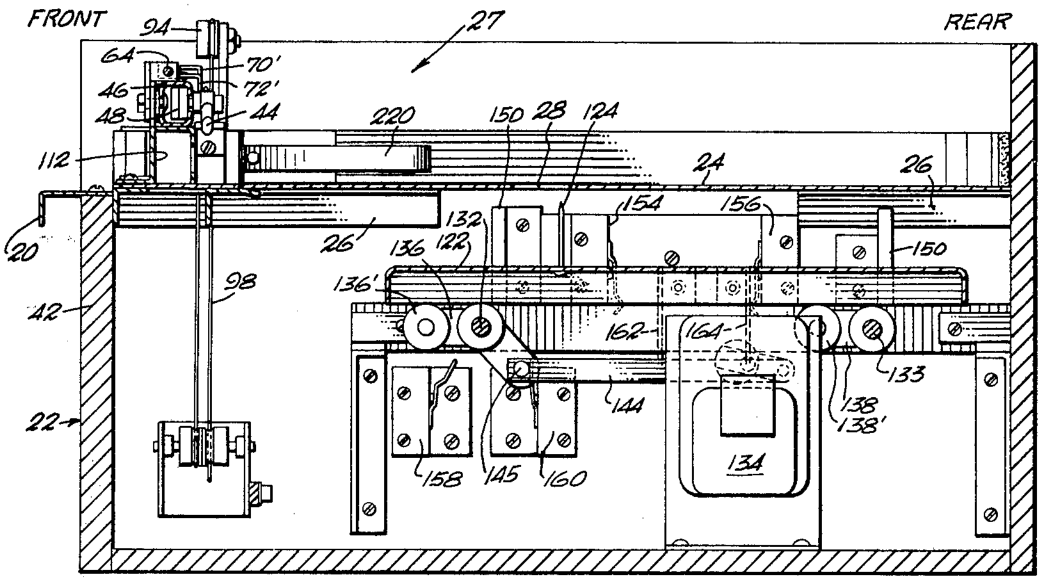
FIGURE 2 is a view in cross section of the improved device illustrating the interior mechanism, the said view being taken along the plane indicated by the line 2—2 of FIGURE 1 and looking in the direction of the arrows.

Referring to the drawings, wherein like reference characters designate like and corresponding parts throughout the different views, and referring particularly to FIGURE 1, there is seen, in combination, (a) a tape reproduction unit 12, which is of a suitable type known in the art, and (b) the improved tape storage and feed unit 14 for continuously feeding an elongated ribbon of tape in band form to the reproduction head, whereby messages recorded on the tape 18 are reproduced. Referring to FIGURE 2, it will be seen that means are provided to connect the unit 12 and the device 14, such as the hook type bracket 20 and that a lid 15 is provided to cover the tray at about the height of the hairpin loops as they lay in the tray.

Referring more specifically to the tape storage and feed unit 14, it will be seen that, in general, it comprises a main frame 22 defining a receptacle, a storage tray 24 for supporting a pattern of interconnected hairpin loops of the tape 18 in side-by-side relation with the leg lengths of each loop generally spanning the lateral surface of the tray and being distributed thereover. Suitable support means 26, seen, for instance, in FIG. 2, are provided on the frame 22 to removably support the tray 24 over an interior operating chamber 27 for housing tape distributing mechanisms to be described. It will be seen that a pattern of slots such as those designated by the numerals 28 are provided in the tray to accommodate passage of movable distributor and tape stacking fingers of the tape distributing mechanism, which will be described more fully hereinafter.

For flowing the tape 18 into and out of the tape reproduction unit 12, feed means are provided. The feed means continuously moves the tape (a) through an input station into the reproduction unit and, after distribution in the tray, (b) from the rear portion of the storage tray, past guide rollers 23 and 25, (c) past an output station (d) and into the reproduction unit 12 for travel past the reproduction head 16. The feed means includes a main drive roller 32 and a co-operating pinch roller 34 which is biased as by the spring 36 into continuous rolling engagement of the tape as it travels along the path indicated by the arrows in FIGURE 1, as directed by the guide 38.

The distribution means will now be described for the tape being fed into the storage tray through the input station, i.e., between the entrance between the main drive roller 32 and the associated pinch roller 34. The distribution means includes (a) structure to provide for lateral distribution of the tape between the input and output stations in the aforesaid hairpin loop forms and (b) structure to move the loops to the rear of the tray in close side-by-side or stacked relation.

Figures 5, 6:
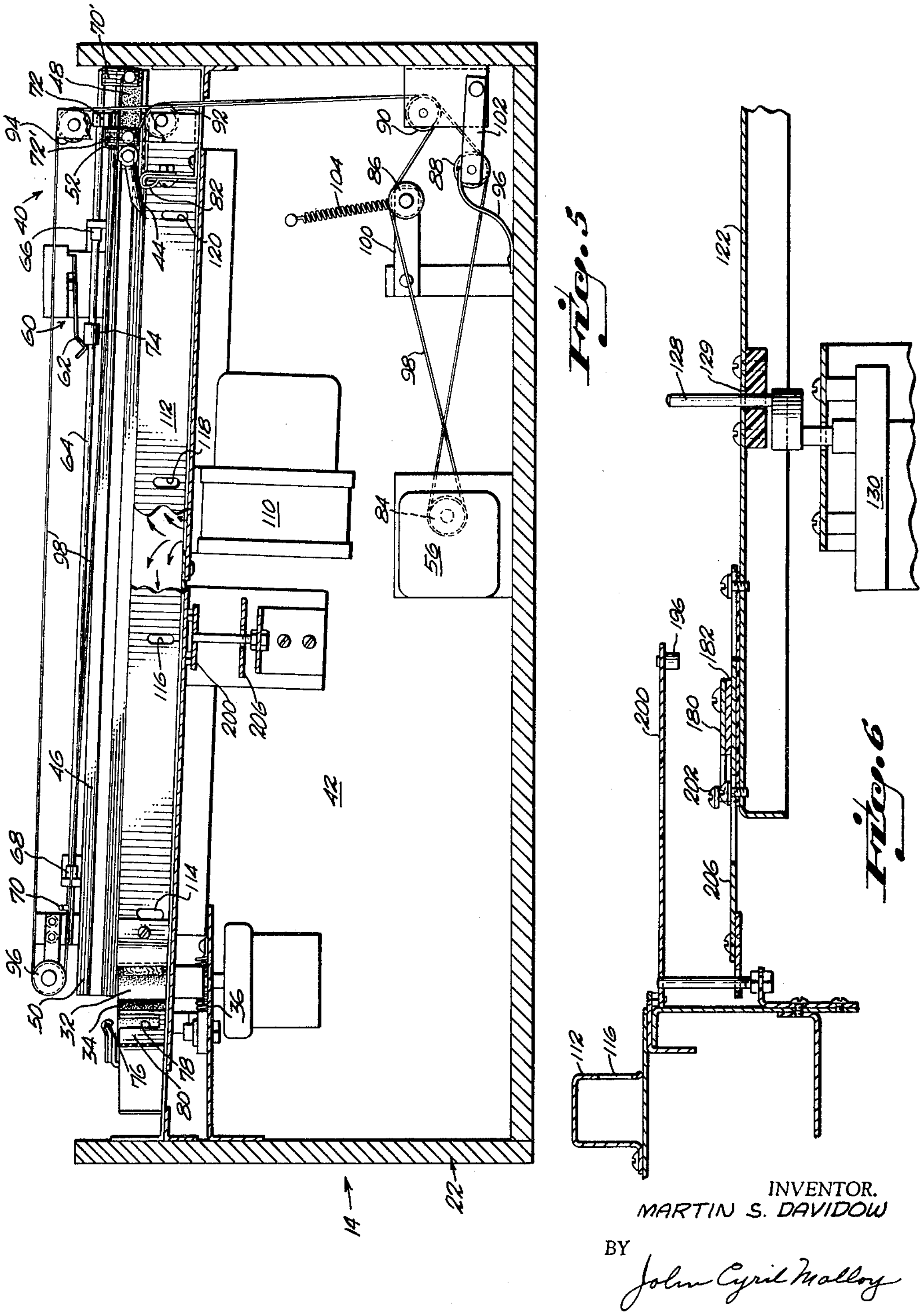
FIGURE 5 is a view in cross section taken along the plane of the line 5—5 of FIGURE 1 and looking in the direction of the arrows.
FIGURE 6 is a partial view taken along the plane indicated by the line 6—6 of FIGURE 4 and looking in the direction of the arrows.

There will now be described the structure to provide for the lateral component of the distribution means, i.e., movement of the tape into laterally extending hairpin loops in generally spanning relation of the tray 24. Reference is made to FIGURE 5 wherein it is seen that a trolley system 40 is provided which extends laterally between the input and output stations, which is across the forward end 42 of the main frame 22 adjacent and slightly rearwardly of the tape feed means. The trolley system successively moves a tape pickup and distribution finger 44 into and out of engagement with the passing tape at spaced intervals therealong to successively lay adjacent hairpin loops in the tray in the manner seen in FIGURE 1. More specifically, the trolley system includes a guide track 46 arranged in laterally spanning relation of the frame, a carriage 48 captivated for reciprocable lateral movement between the ends of the track, and drive means to move the carriage to and fro between the track ends 50 and 52. The drive means for the trolley system includes a reversible motor 56, a pulley system, and a motor control mechanism 60 to cyclically reverse the motor 56 and the direction of travel of the carrier each time the end of the track is approached. The control mechanism 60 includes a switch arm 62 electrically connected to the motor 56 for reversing it, and a switch operator bar 64. The switch operator bar 64 is slidably supported for limited lateral movement by slide blocks 66 and 68 which permit the bar to respond by slidable movement in a lateral direction when either of the enlarged portions, comprising switch control members, is engaged by an associated pusher element 70′ or 72′ secured in upstanding relation on the carriage. The pusher element 70′ and 72′ which are each of a different height are carried on the carriage in an arrangement such that the associated enlarged portions or switch control members 70 and 72 of the operator bar 64 are in the respective paths of travel of the pusher elements. A switch operator button 74 fixed on the shaft is thus carried in a cyclical to and fro movement with the carriage to reciprocably engage the switch arm 62 and reverse current flow to the motor 56 each time the carriage approaches the limits of movement at the opposite ends 50 and 52 or, as they will be referred to hereinafter, the stations of the guide track 46.

Abutment means or mechanical switch means for the finger are provided at the track end 50 or, as it will alternatively be denominated, the tape pickup station of the trolley system, and at the other end 52, or as it will be alternatively denominated, the tape release station. The abutment means are adapted to swing the tape pickup and distribution finger 44 to raise it above the tape to release the same at the right-hand extent of the finger travel, which is at the tape release station 52: the abutment means are also adapted to lower this finger outside the tape band at the tape pickup station 50 as it is fed into the tray at the left-hand extent of the carrier travel. The abutment means includes a pickup abutment or mechanical switch member 76 which is arranged in the path of travel of the finger 44 when it is in the horizontal attitude and extends so as to inter-engage the finger and deflect the same downwardly into a vertical or tape pickup attitude which is achieved when the carriage reaches the pickup station 50. At the pickup station 50 the finger passes through an open ended slot 78 into a chamber defined by the walls 80 of the station 50. It will be noted that the chamber at the pickup station 50 and the finger 44 are at all times wholly beyond the path of travel of the tape, i.e., always outside of the tape band, as it flows past the main drive roller 32 and pinch roller 34 and enters the tray, so that as the carriage commences its reverse travel toward the tape release station 52, a length of tape is dragged at a bight portion or loop vertex laterally across the door of the tray to define one of the hair pin loops. As the finger approaches the tape release station 52, it engages the tape release abutment or mechanical switch member 82 which deflects or swings the finger 44 into a horizontal attitude to release the tape. Thereafter, return movement of the horizontally disposed tape pickup and release finger in the horizontal attitude takes place as the carriage returns to the pickup station 50 for deflection again into a vertical attitude to travel the next hair pin loop vertex of the tape across the tray. During the time that the finger returns to the pick-station, by reason of the continuous operation of the feed means, one half the length of the hair pin loop is flowed into the tray which provides slack as the finger moves to the release station with the tape which flows into the tray as this movement occurs defining the opposite leg of the hair pin loop. The operation of the drive means for reciprocal movement of the carriage will be apparent in view of the following: the motor 56 drives the pulley system which includes a drive pulley 84, suitable direction-changing rollers, such as 86, 88, 90, 92, 94, and 96, which are secured in a fixed position relative to the tray, and a taut cord 98 which is connected to the carriage at each end so that it moves with the cord. Tension adjusting means for the pulley system are provided, the tension means comprising the rollers 86 and 88, each of which are mounted on the terminal end of a swingable arm such as 100 and 102, each of which is biased to tension the cord by an associated spring means such as that designated by the numeral 104 comprising a coil spring or the leaf spring 96.

In the following paragraphs reference will be made to the structure for moving the loops to the rear of the tray. There are two components which contribute to this movement: first, a blower system is provided to continuously urge the tape rearwardly in the tray; and secondly, a mechanism is provided which includes rearwardly movable stacking pins or vertical finger-like members to move the tape into a stacked position in the rearward portion of the tray by continually moving groups of adjacent hair pin loops of tape toward the rear of the tray.

Referring first to the blower system for moving the loops to the rear of the tray, this system comprises a blower 110 having an outlet in fluid-tight engagement with a duct member 112 laterally arranged across the front of the tray, forwardly of the path of travel of the tape pick-up and release finger. The duct member is provided with a plurality of ports, such as 114, 116, 118 and 120, which face rearwardly and continuously eject streams of air gently applying pressure to the tape to urge a rearward movement of it.

The mechanism for rearwardly moving the stacking pins while projecting through the slots 28 in tray floor, includes a carrier 122 to which pins such as 124 are mounted in upstanding relation. The carrier is adapted be moved by dual drive means in a predetermined path of movement which is such that each point on the pin carrier moves through four substantially discrete components of motion in a continuous closed path with each of the main lengths of the components being at right angles to the other: i.e., the carrier moves through distinct phases of movement, a forward movement, thence an upward movement, thence a rearward movement, and to complete the cycle, a lowering movement. It will be appreciated from the following description that by this path of movement, a plurality of pins are adapted to be repeatedly moved into the tray at the forward position thereof and move rearwardly to drag and stack a plurality of adjacent hair pin loops to the rear of the tray whereupon the pins are withdrawn as the carrier is lowered to move forward at a lower level for subsequent raising and movement by the pins of a further group of the loops to the rear of the tray.

The forward and rearward phases or components of the carrier motion are achieved by a first carrier moving means which includes: an eccentrically mounted drive pin 128 passed through a lateral slot 129 in the carrier 122 so that the carrier is cyclically moved forwardly and rearwardly as the motor 130 continuously drives the eccentric pin 128 at a relatively slow rate of speed.

Figure 3:
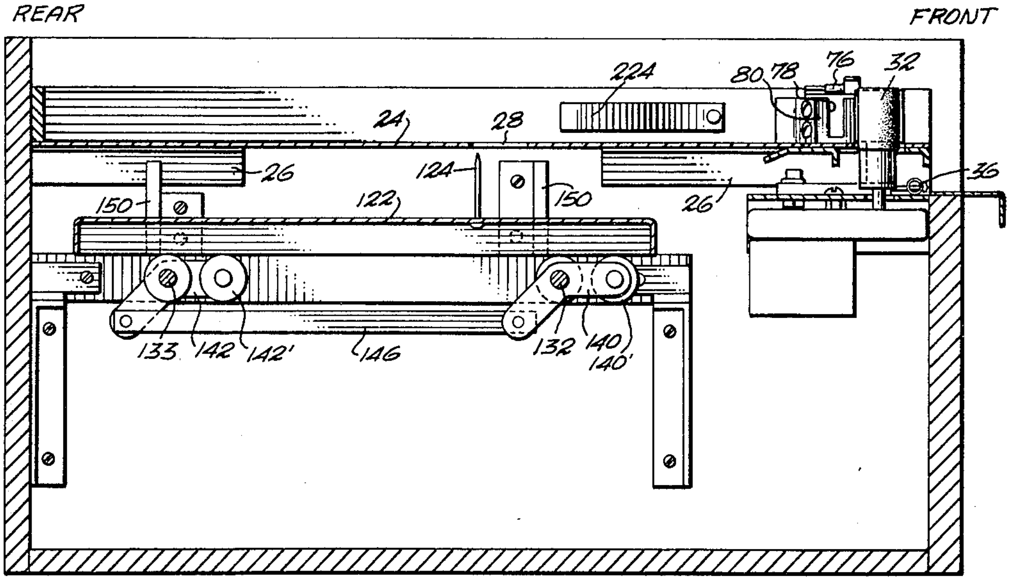
FIGURE 3 is a view similar to that of FIGURE 2 and illustrating the interior mechanism, the said view being taken along the plane indicated by the line 3—3 of FIGURE 1 and looking in the direction of the arrows.

The lifting and lowering of the pin carrier occurs at the forward and rearward extremities respectively of the forward to rearward carrier motion, and these lifting and lowering phases of movement are accomplished by a second carrier moving means. The second carrier moving means includes a motor 134 to move a drive linkage which is arranged (a) to raise the carrier at the terminus of forward movement so that the pins extend upwardly at spaced points into the forward portion of the tray and between the legs of the loops of tape, and (b) to lower the carrier at the rearward terminus of movement to withdraw the pins. The drive linkage is supported on a pair of laterally extending shafts 132 and 133 which are supported from the frame. On each of the ends of the shaft a rotatable arm such as 136, 138, 140, and 142 is keyed, which arms are of a common length and each of which carries a roller 136', 138', 140', 142' all of which are at the same angular relation with respect to their respective associated shafts so as to define a carrier support plane through the upper periphery of the rollers. As is apparent in FIGURES 2 and 3, the carrier is supported on the rollers and each of the arms is connected to one another and to the motor 134 through the shafts and link means, 144 on the right and 146 on the left, and the link 144 is operably connected to the reversible motor and constitutes a drive link.

Figure 4:
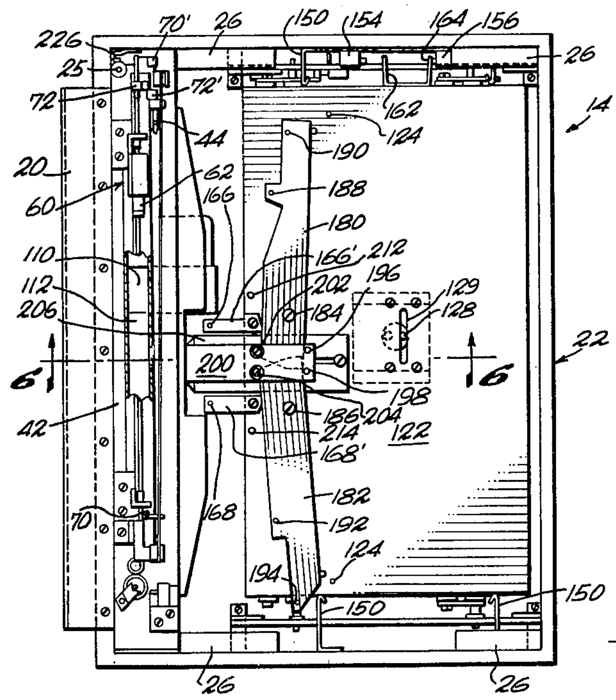
FIGURE 4 is a plan view of the improved storage and feeding unit for the tape as seen in FIGURE 1 with the tape storage tray removed.
Figure 7:
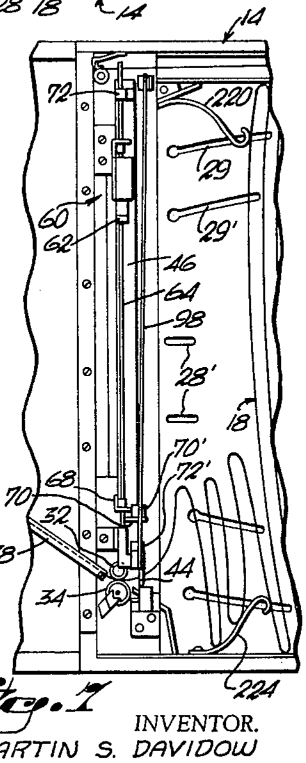
FIG. 7 is a partial view similar to FIG. 1 with the distributor means in a different position than as seen in FIG. 1.

The operation of the pin carrier is as follows: the pin carrier is continuously moved by the first carrier movement means rearwardly at an elevated level with the pins of the carrier projecting into the tray, and forwardly at a lowered level with the pins withdrawn from the tray. The forward to rearward movement takes place continuously as the eccentric 128 in the slot 129 is turned at a relatively slow rate of speed by the motor 130. Guide means 150 are provided to slidingly interconnect the frame and the carrier and constrain the carrier to a predetermined path of forward and rearward movement in discrete upper and lower planes respectively with the shafts and their associated rollers maintaining the carrier in a predetermined attitude while in those planes. The motor 134 for raising and lowering the pin carrier is energized by the on-off switches seen in FIGURE 2 and designated by the numerals 154, 156, each comprising on switches, and 158 and 160, each comprising off switches. Switch engaging means 162 and 164 are carried in depending relation on the carrier so as to operate the arm switches in seriatum as the carrier moves through the aforesaid forward and rearward phases of movement. First to raise the carrier at the forward end of its movement at the lower level, and secondly to lower the carrier when at its rearward extent of movement, by rotating the shaft to operate the drive link members 144 and 146, first in one direction of movement and thence in another direction of movement. It will be noted that as the shafts are rotated, moving the carrier surface either to the upper or to the lower plane of movement, a projection 145 carried by the shaft compressing the pivot pin which supports the link 144 is arranged to engage either of the off switches 158 or 160 depending upon the direction of rotation to interrupt current flow to the motor 134 when the carrier has been raised or lowered, as the case may be. As indicated in FIGURE 4, a pair of forwardmost pins 166 and 168 are supported on forwardly extending portions 166' and 168' of the pin carrier so as to be adapted to be moved by the carrier upwardly through the slots 28' in close adjacent relation to the path of travel of the tape as it is carried by the swingable pickup and release fingers for moving a forwardmost loop of the distributed tape to the rear of the tray with each cycle of the pin carrier movement.

Additional distribution means for the tape loops in the tray are provided. The additional distribution means includes a plurality of pins which are arranged to interengage the tape and which are carried on pivotal arms mounted on the tape carrier. More specifically, the additional distribution means comprises a pair of oppositely-extending pivotal arms 180 and 182, each of which are pivotally connected by the pivot pins 184 and 186 to the pin carrier so that the terminal ends of the arms, to which upstanding pins 188, 190, 192 and 194 are mounted, are moved through an extended arcuate path of movement with respect to the path of travel of the pins carried directly on the carrier. To accommodate this movement, extended arcuate slots 29 and 29' are provided in the tray as seen in FIGURE 1. The pivotal movement of the arms is effected by the mechanism seen in FIGURE 6. This mechanism includes a pair of arm-engaging pins such as 196 and 198 which are carried in depending relation on the cantilever type, rearwardly extending projection 200 supported on the frame, and a pair of upstanding pins 202 and 204 in fixed position on a lower element 206 supported on the frame in spaced relation beneath the aforesaid projection 200, the distance between the upper cantilever type projection and the lower elements being generally equal to the distance between the upper and lower support planes of the pin carrier, as will be apparent hereinafter. It will be seen on reference to FIGURES 4 and 6 that, when the arms are in the position shown in FIGURE 4, that is, with the terminal ends at the rearward position of their respective arcuate paths of travel and in the lowered position, any forward movement of the carrier causes the 202 and 204 to abut their respective associated arms and by producing a torque cause pivotal movement of each of the arms as the pin carrier moves forward until the arms abut the stop lugs 212 and 214. When the pin carrier has been raised so that the arms no longer are in engagement with the pin 208 and 210 referred to above, rearward movement of the pin carrier will cause the rearward edge of the arms to engage the depending pins 196 and 198 pivoting the arms and moving the outer terminal ends thereof towards the rearward portion of the tray so that the pins carried on the arms travel to the respective rearward portions of the associated slots and the tape is traveled and stacked rearwardly in the tray. Keeper means 220 and 224 are provided to retain the stacked tape in the rearward portion of the tray, the said keeper means comprising leaf springs extending into the tray from the side walls of the frame and including reversely bent, distal end portions so that the springs are adapted to yield on passage of the pins as they are carried on the swinging arms storing energy therein so that the same recover their position after passage of the pins, whereby to captivate the tape loops in the rearward portion of the tray, the pins moving to the front after being lowered below the main upper plane of movement of the carrier so that their return path is unobstructed by the said keeper means.

Referring to FIGURE 1, the upper central portion thereof, it is seen that in association with the roller 25 a wiper member 226 is provided to continuously sweep the surface of the video tape to maintain the same in a clean condition. Tension adjusting means are provided for this wiper arm which serves the additional function of regulating the tension which is exerted on the tape between the roller 25 and the feed and pinch roller of the feed means.

It will be important to point out with respect to the pin carrier movement that the velocity of the pin carrier at about its forwardmost and rearwardmost positions of travel, that is, at the reversal of direction positions, is relatively slow as contrasted to the velocity at about the midpoint of its travel by reason of the eccentric drive means. For this reason, when the second carrier drive means is operable to raise the pins as at the time when the pin carrier is just approaching its forwardmost extension of travel, the entrance of the pins is in a substantially vertical direction, so as not to be moving rearwardly at the same time, which it has been found tends to cause damage to the tape in the tray. The same characteristic, substantially discrete component of downward movement of withdrawal of the pins takes place in a substantially similar type of movement at the rearward extremity of travel of the carrier. In the preferred embodiment a guide bow member 225 of arcuate form projects medially into the rear portion of the tray for orientation of the loops. Also, it has been found that a slight tilting of the tray about its forward and rearward access, as shown, provides a smoothness of tape flow and tends to maintain tape orientation at the rear roller 23.

While the instant invention has been shown and described herein in what is conceived to be the most practical and preferred embodiment, it is recognized that departures may be made therefrom within the scope of the invention.

What is claimed is:

1. For use with a video tape unit including a reproduction head, a tape storage device to distribute, store and continuously feed an elongate length of thin video tape ribbon in the order of about one millimeter in thickness in band form past the reproduction head for continuous reproduction of messages on the video tape without rewinding of the ribbon, comprising:

a generally flat type storage tray, feed means to flow the ribbon into and out of the storage tray, with the longitudinal edges of the ribbon in a generally vertical alignment, said feed means including an input station and an output station in spaced relation;

the improvement comprising;

(A) ribbon distribution means including first and second movable finger means, (B) support means for said first finger means and support means for said second finger means, (C) said first finger means including (1) a finger (2) trolley means between said input station and output station to cyclically guide said finger along a closed predetermined path of movement, (3) carriage means on said trolley for said finger to move said finger along said predetermined path in separate phases of movement, (a) a first phase of movement of said finger into said tray outside of said band at said input station, (b) a second phase of movement with said finger in said tray in abutting engagement with the outside of said tape band across said tray to a tape release position substantially at said output station so as to define a hairpin loop of tape with said finger in the vertex of said loop while in said second phase of movement, (c) a third phase of movement of withdrawal of said finger from said loop at said tape release position, (d) a fourth phase of movement to reposition said finger to commence said final phase of movement, and (4) drive means to cyclically move said finger through said phases of movement, (D) said second finger means including (1) a carrier, (2) a plurality of pins carried on said carrier, (3) guide means interengaging said carrier to constrain said carrier to a predetermined closed path of movement away from a line connecting said input and output station along a predetermined path through separate stages of movement;

(a) a first stage of movement of penetration of said pins into said tray in a direction generally perpendicular to the main plane of said tray, (b) a second stage of movement away from said line with said pins in abutting engagement with the planar surfaces of the tape to move a plurality of said hairpin loops of tape away from said line, (c) a third stage of movement of withdrawal of said pins from said tray and (d) a fourth stage of movement toward said line to reposition said carrier to commence said first stage;

(5) drive means to move said carrier and pins cyclically through said stages of movement, and (6) lid means to cover the tray.

2. The improved device as set forth in claim 1 wherein a frame is provided to support the tray and to house said ribbon distribution means.

3. The improved device as set forth in claim 1 wherein means are provided to attach the tape storage device to a video tape unit.

4. The improved device as set forth in claim 1 wherein said ribbon distribution means includes a blower having an outlet, a duct in fluid-tight connection with the outlet, and said duct extending between said input and output stations and having openings arranged to direct a flow of air in a direction away from said line and toward the closest adjacent leg of the hairpin loops.

5. The improved device as set forth in claim 1 wherein an arcuate bow member is provided across said tray in spaced relation from said line between said stations to define a bed between said line and said bow member, the central zone of said bow member extending toward said line to orient said loops when in said tray in cooperation with said second finger means.

6. The improved device as set forth in claim 1 wherein tension adjusting means are provided for said feed means.

7. The improved device as set forth in claim 1 wherein said trolley means includes guide track means to captivate said carriage means for reciprocable movement be-means interconnected with said drive means to cyclically tween said input station and output station and pulley move said finger through said phases of movement.

8. The improved device as set forth in claim 7 wherein said trolley system includes switch means to move said finger into and out of position for effecting said phases of movement.

9. The improved device as set forth in claim 8 wherein said switch means includes abutment means at said tape release station to engage said finger and pivot means to connect said finger to said carriage so that as said finger is moved into engagement with said abutment means, it is rotated about said pivot to release said tape.

10. The improved device as set forth in claim 1 wherein said second finger means includes means arranged on the carrier to inter-engage said hairpin loops on operation of said second finger means outwardly of the forward to rearward center line of said tray to move the bight portions of the hairpin loops relatively more rearwardly in the tray than the central portion of the legs of the hairpin loops and an arcuate member in the rear of the tray is provided in spaced relation from said line between said stations to accommodate a relatively increased bulk of the tape on either side of the leg portion of the loops as it lays in a stored condition on the tray bed.

References Cited

UNITED STATES PATENTS

| | | | |
|---|---|---|---|
| 2,521,440 | 9/1950 | Bannon ---------- | 226—118 X |
| 2,865,639 | 12/1958 | Gillette ---------- | 226—118 X |

M. HENSON WOOD, Jr., Primary Examiner

R. A. SCHACHER, Assistant Examiner

U.S. Cl. X.R.

226—119